April 24, 1956      S. E. CLARK      2,743,101
DEVICE FOR GUIDING CUTTING TORCHES
Filed Dec. 30, 1952      2 Sheets-Sheet 1
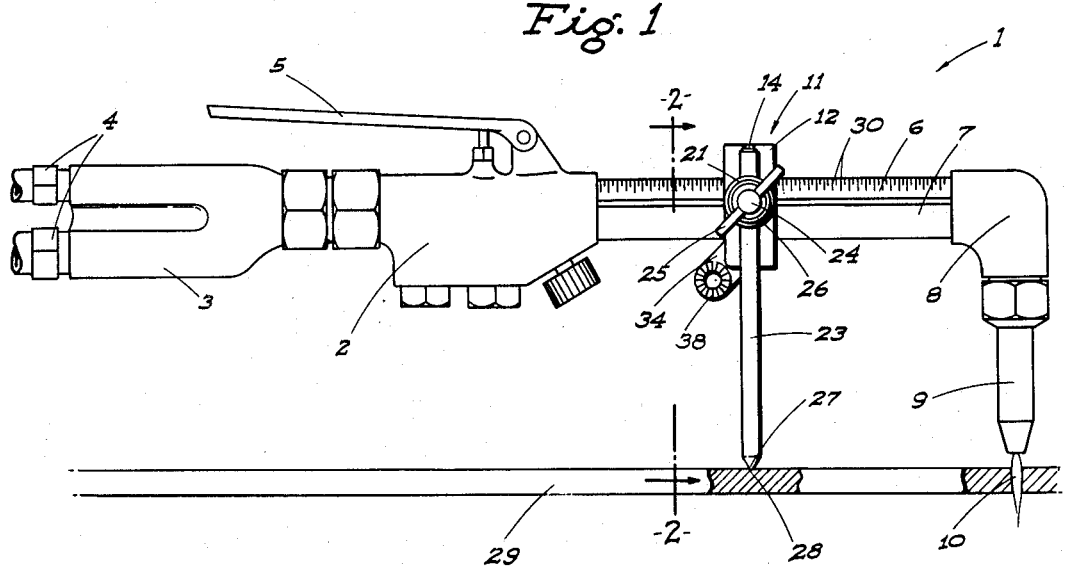
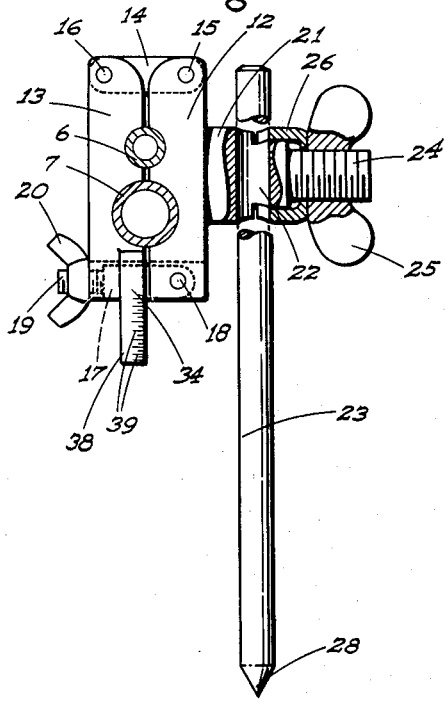
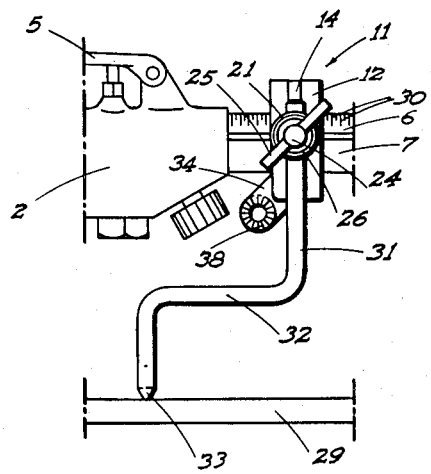
INVENTOR
Shirley E. Clark
BY
ATTORNEYS April 24, 1956  S. E. CLARK  2,743,101
DEVICE FOR GUIDING CUTTING TORCHES
Filed Dec. 30, 1952  2 Sheets-Sheet 2

INVENTOR
Shirley E. Clark

BY
ATTORNEYS

United States Patent Office 2,743,101
Patented Apr. 24, 1956

2,743,101

DEVICE FOR GUIDING CUTTING TORCHES

Shirley E. Clark, Stockton, Calif.

Application December 30, 1952, Serial No. 328,759

1 Claim. (Cl. 266—23)

The present invention is directed to, and it is a major object to provide, a novel device adapted for use on a gas type, metal cutting torch, for the purpose of effectively guiding the same when making a circle cut through a work plate, either at a right angle to said plate or on a bevel.

Another important object of the present invention is to provide a guiding device, for a cutting torch, which is also useful to guide the latter when making lineal cuts following a guide template.

An additional object of the invention is to provide a guiding device, for a cutting torch, which may be readily embodied in the torch as a unitary part thereof at the time of manufacture, or can be applied as an attachment; the invention including—when the device is used as an attachment—a novel securing clamp.

A still further object of the present invention is to provide a guiding device, for a cutting torch, which substantially improves the accuracy of cuts made with the torch and greatly aids in the convenience of manipulation thereof by the operator.

It is also an object of the invention to provide a guiding device, for a cutting torch, which is designed for ease and economy of manufacture.

Still another object of the invention is to provide a practical guiding device, for a cutting torch, and one which will be exceedingly effective for the purpose for which it is designed.

These objects are accomplished by means of such structure and relative arrangement of parts as will fully appear by a perusal of the following specification and claim.

In the drawings:

Fig. 1 is a side elevation of a cutting torch having the guiding device applied thereto, except that the supporting leg, for bevel cuts, is omitted.

Fig. 2 is an enlarged transverse section on line 2—2 of Fig. 1; the center pin clamping assembly being shown partly broken away and in section.

Fig. 3 is an enlarged fragmentary side elevation showing a modification of the center pin.

Figure 4:
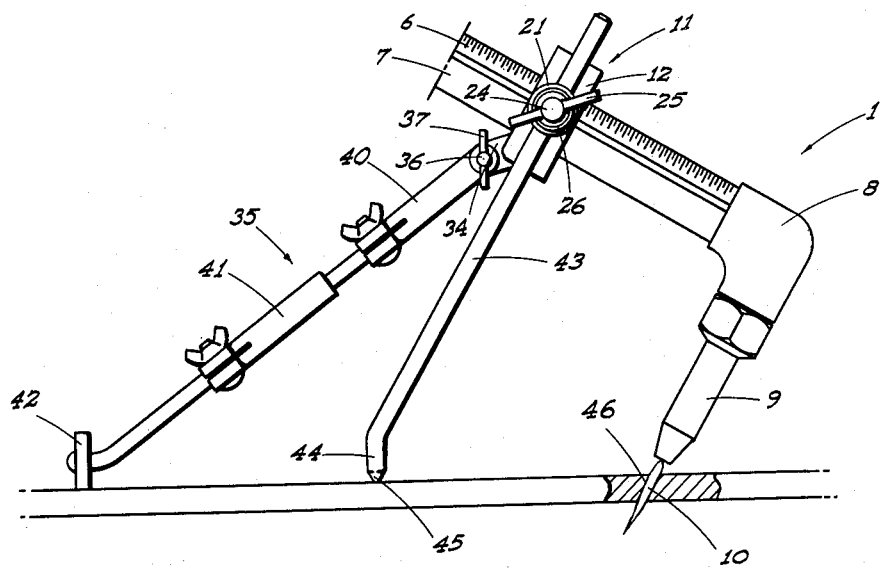
Fig. 4 is a side elevation of the device including the supporting leg used for making bevel cuts; the torch being shown only in part.
Figure 5:
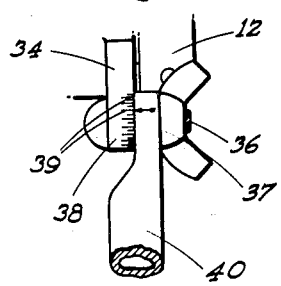
Fig. 5 is a fragmentary elevation showing the adjustable rotary connection for the telescopic guide leg.

Referring now more particularly to the characters of reference on the drawings, and at present to Figs. 1 and 2, the device is adapted for use in connection with a conventional gas type metal cutting torch, indicated generally at 1, which torch includes a valve body 2 which is fed the fuel gases by a manifold 3 having hose fittings 4 on the outer end thereof. The manifold 3 projects rearwardly from the valve body 2, and a valve control handle 5 is carried by said body.

A pair of gas feed pipes, indicated at 6 and 7, project forwardly from the valve body 2, one above the other and in parallelism; the feed pipe 6 being of smaller diameter than the feed pipe 7. At their forward ends the pipes 6 and 7 communicate with, and support, a head 8, and in turn it carries a downwardly projecting nozzle 9 from which the cutting flame 10 delivers.

The present invention contemplates the attachment, to a part of the above described torch 1, and preferably to the feed pipes 6 and 7, of a clamping unit, indicated generally at 11.

The clamping unit 11, which is adjustable lengthwise along the pipes 6 and 7, comprises a pair of opposed vertical clamping blocks, indicated at 12 and 13; such clamping blocks having semi-circular notches in adjacent edges thereof, as shown, for substantially matching engagement with opposite sides of said pipes 6 and 7.

A top link 14 extends between, and is pivotally connected to, the upper ends of the clamping blocks 12 and 13 by pivots 15 and 16. With this arrangement the clamping blocks 12 and 13 may be swung apart, straddled over the pipes 6 and 7, and then clamped to the latter by a bottom or swing link 17. The clamping blocks 13 are downwardly channeled at their lower ends, and the link 17 normally lies in the channels, being pivoted to the lower end of the clamping block 12, as at 18.

At the opposite end the swing link 17 has a threaded neck 19 carrying a wing nut 20 which bears against the outer edge of the clamping block 13. When in the swing link 17 is in a horizontal position, as shown in Fig. 2, the wing nut 20 is tightened, whereby to effectively clamp the pipes 6 and 7 between clamping blocks 12 and 13.

The clamping block 12 is formed with a laterally projecting boss 21 having a vertical bore 22 therein; such bore receiving the upper end of a downwardly depending center pin 23. The outer end portion of the boss 21 is formed as a reduced-diameter threaded neck 24 having a wing nut 25 thereon; such wing nut 25 abutting a locking collar 26 which surrounds the boss 21 and bears in securing relation against the center pin 23. The center pin 23, while normally fixed, is vertically adjustable as working conditions may require; i. e., to level the cutting torch.

At its lower end the center pin 23 is formed with a point 27 which is adapted to engage in a punched or drilled center mark 28 in the work plate 29.

For the purpose of cutting a perfect circle, the clamping unit 11 is first adjusted along the pipes 6 and 7 to a predetermined point ascertained by reading such unit on a radius scale 30 marked on one of said pipes. Thereafter, with the point 27 of the center pin 23 in the center mark 28, the torch—being here horizontal—is rotated manually about said center pin 23 as an axis, which results in the cutting of a perfect circle in the work plate 29.

In order to increase the effective radius of the guiding device, a center pin 31, as shown in Fig. 3, may be used; such center pin having an outward offset therein, whereby the point 33 of said pin lies further from the nozzle 9 than would otherwise be the case.

At times it is desirable not only to cut a perfect circle in the work plate 29, but also to make the cut at an incline or bevel; this being accomplished by the present device, and by means of the structure shown in Fig. 4, as follows:

The clamping block 13 is formed with a downwardly and outwardly inclined attachment ear 34 which extends in the longitudinal plane of the torch, and such attachment ear is coupled to the upper end of an adjustable telescopic guide leg, indicated generally at 35, by a normally fixed but adjustable rotary or pivotal connection which includes a pivot bolt 36 and a wing nut 37. Additionally, the rotary connection comprises engaged serrated discs 38.

By loosening the pivot bolt 36 the guide leg 35 may be set to support the cutting torch 1 at a predetermined angle, and to aid in the selection of such angle the disc 38 may have scale markings 39 thereon reading on a cooperating point (as indicated) on the other disc.

The telescopic guide leg 35 includes a pair of telescopic sections, indicated at 40 and 41, which permit of effective length adjustment of said leg.

At the lower end thereof the guide leg 35 is fitted with a guide wheel 42; the leg extending longitudinally at a downward and outward incline toward said wheel, and the axis of the leg being generally radial of the center pin.

In this embodiment the center pin 43 has its lower end portion 44 turned to substantially vertical, so that the point 45 shall engage properly in the center mark.

With the center pin 43 adjusted to proper radius, and the guide leg 35 adjusted to maintain proper angle of the torch, rotation of the latter about the point 45 as an axis, results in the torch cutting a perfect circle with the cut on a bevel, as at 46.

Figure 6:
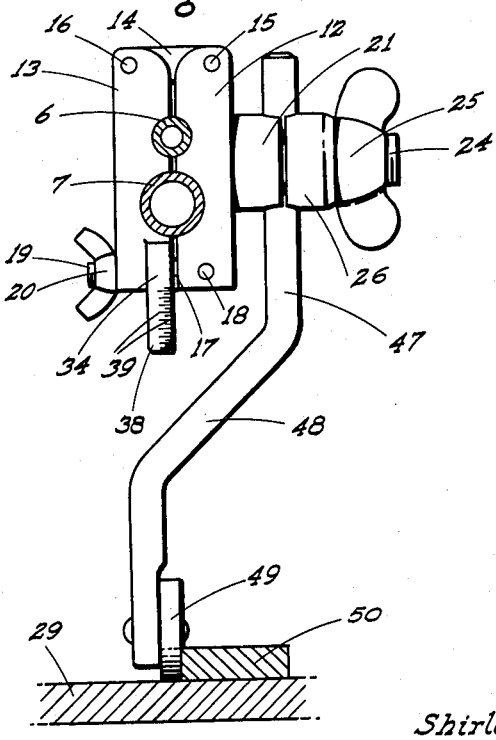
Fig. 6 is a view similar to Fig. 2, but shows a still further modification of the center pin.

Under certain working conditions it is desirable to make guided lineal cuts, and to accomplish this the guide leg 35 is omitted, just as in Fig. 1, and a center pin 47, as in Fig. 6, is employed; such center pin having a lateral offset 48 therein intermediate its ends, with a wheel 49 mounted on the lower end of said pin for rotation about a transverse axis.

For making the cut the wheel 49 is run in guided engagement with a template 50 which lies atop, and is fixed to, the work plate 29; the cut as made by the torch conforming exactly to the template 50.

By reason of the simple, and convenient-to-use locking device therefor, the several ones of the center pins can be interchanged readily and without substantial loss of time; it also being easy to apply or detach the guide leg used for bevel cuts.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful, and upon which Letters Patent are desired:

A guiding device, for a cutting torch having a pair of longitudinal feed pipes one above the other, and a nozzle depending from the outer ends of the pipes; said device comprising a clamping unit straddling and secured to said pipes, a boss projecting laterally from the clamping unit, a bore through the boss from bottom to top, a center pin engaged in the bore and depending from the boss, and means securing the pin against escape from the boss; said clamping unit comprising transversely spaced clamping blocks notched to matchingly engage the pipes from opposite sides, and links connecting the blocks above and below the pipes, one link being pivotally connected to both blocks, and the other link being pivotally connected to one block and releasably secured to the other.

References Cited in the file of this patent

UNITED STATES PATENTS

| | | |
|---|---|---|
| 1,495,994 | Farmer | June 3, 1924 |
| 1,564,636 | Smith | Dec. 8, 1925 |
| 1,792,317 | Marsh | Feb. 10, 1931 |
| 2,224,242 | Young | Dec. 10, 1940 |
| 2,296,480 | Nicolai | Sept. 22, 1942 |
| 2,323,298 | Cook | July 6, 1943 |
| 2,341,751 | Willoughby | Feb. 15, 1944 |
| 2,356,811 | Bellrose | Aug. 29, 1944 |
| 2,424,286 | Robbins | July 22, 1947 |
| 2,483,294 | Miner | Sept. 27, 1949 |

FOREIGN PATENTS

| | | |
|---|---|---|
| 249,518 | Germany | July 19, 1912 |